United States Patent
Harada et al.

(10) Patent No.: US 7,406,378 B2
(45) Date of Patent: Jul. 29, 2008

(54) HYBRID VEHICLE AND CONTROL METHOD THEREOF

(75) Inventors: Osamu Harada, Toyota (JP); Katsuhiko Yamaguchi, Nissin (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 139 days.

(21) Appl. No.: 11/587,753

(22) PCT Filed: May 26, 2005

(86) PCT No.: PCT/JP2005/010089

§ 371 (c)(1),
(2), (4) Date: Oct. 26, 2006

(87) PCT Pub. No.: WO2005/115787

PCT Pub. Date: Dec. 8, 2005

(65) Prior Publication Data

US 2007/0220883 A1    Sep. 27, 2007

(30) Foreign Application Priority Data

May 28, 2004  (JP) .............................. 2004-159793

(51) Int. Cl.
*B60T 7/12*    (2006.01)
*G06F 19/00*   (2006.01)
(52) U.S. Cl. ............... 701/103; 123/41.01; 701/123
(58) Field of Classification Search ........... 701/101, 701/103, 114, 115, 123; 123/41.01, 41.05; 903/905

See application file for complete search history.

(56) References Cited

U.S. PATENT DOCUMENTS

| 5,327,987 | A  | * | 7/1994  | Abdelmalek   | 180/65.2 |
| 6,945,029 | B2 | * | 9/2005  | Viteri       | 60/39.17 |
| 2002/0162457 | A1 | * | 11/2002 | Hyodo et al. | 96/109 |

FOREIGN PATENT DOCUMENTS

DE    198 01 167 C1    4/1999

(Continued)

Primary Examiner—John T Kwon
(74) Attorney, Agent, or Firm—Kenyon & Kenyon LLP

(57) ABSTRACT

In response to simultaneous ON settings of a heater switch signal HSW and an eco switch signal ESW, an eco priority map is set to an intermittent operation permission map (step S350). The heater switch signal HSW is output from a heater switch that is operated to warm up a passenger compartment, while the eco switch signal ESW is output from an eco switch that is operated to give preference to improvement in fuel consumption of the vehicle over the heater function. The eco priority map is designed to allow intermittent operation of an engine in a lower range of cooling water temperature Tw of the engine than that in a heater-on state map set in response to OFF setting of the eco switch signal ESW and ON setting of the heater switch signal HSW. The control procedure of the invention refers to the intermittent operation permission map and determines whether the intermittent operation of the engine is allowed or prohibited, based on the current cooling water temperature Tw and a starting-time cooling water temperature Tst, which represents a temperature of cooling water at a first start of the engine since activation of the vehicle system (step S360).

12 Claims, 8 Drawing Sheets

FOREIGN PATENT DOCUMENTS

| | | |
|---|---|---|
| DE | 100 38 280 A1 | 3/2001 |
| EP | 1 391 338 A1 | 2/2004 |
| JP | 09-233601 | 9/1997 |
| JP | 11-180137 | 7/1999 |
| JP | 2000-314333 | 11/2000 |

* cited by examiner

HYBRID VEHICLE AND CONTROL METHOD THEREOF

This is a 371 national phase application of PCT/JP2005/010089 filed 26 May 2005, claiming priority to Japanese Patent Application No. 2004-159793 filed 28 May 2004, the contents of which are incorporated herein by reference.

TECHNICAL FIELD

The present invention relates to a hybrid vehicle and a control method of a hybrid vehicle.

BACKGROUND ART

One proposed hybrid vehicle is equipped with an air conditioning system to warm up a passenger compartment with an engine as a heat source and intermittently operates the engine, based on a measured internal temperature of the passenger compartment, a target temperature set in the air conditioning system, and a cooling water temperature of the engine (see, for example, Japanese Patent Laid-Open Gazette No. 9-233601). This prior art hybrid vehicle drives the engine to ensure the sufficient level of heating performance even at a stop of the vehicle or in a motor drive mode using an electric motor alone for driving, when a temperature difference ΔT between the target temperature set in the air conditioning system and the measured internal temperature of the passenger compartment is not less than a preset reference level, which depends upon the cooling water temperature of the engine.

DISCLOSURE OF THE INVENTION

For the purpose of the environmental protection, preference may be given to the enhanced energy efficiency of the vehicle over the high-level heating performance of the passenger compartment. The permission for the intermittent operation of the engine as the heat source even in a low temperature range for the restricted heating performance sacrifices the comfortable ride of the driver and other passengers, while enhancing the energy efficiency of the vehicle. The prohibition on the intermittent operation of the engine as the heat source for the high-level heating performance, on the other hand, undesirably lowers the energy efficiency of the vehicle, while ensuring the comfortable ride of the driver and other passengers.

The present invention aims to improve the energy efficiency of the vehicle while ensuring a certain level of heating performance in a hybrid vehicle and a control method of a hybrid vehicle. The invention also aims to achieve adequate intermittent operation of an internal combustion engine in a hybrid vehicle and a control method of a hybrid vehicle.

In order to attain at least part of the above aims, a hybrid vehicle and a control method of a hybrid vehicle of the present invention is constructed as follows.

The present invention is directed to a first hybrid vehicle that is equipped with an internal combustion engine and a motor and is driven with power output from at least the motor to a drive shaft, the hybrid vehicle including: a heating module that uses the internal combustion engine as a heat source to warm up a passenger compartment; a fuel consumption priority instruction module that gives a fuel consumption priority instruction for giving preference to fuel consumption, in response to an operator's request; a cooling water temperature measurement module that measures a cooling water temperature in the internal combustion engine; a power demand setting module that sets a power demand required for the drive shaft. The first hybrid vehicle further includes an intermittent operation permission module that, in response to no reception of the fuel consumption priority instruction given by the fuel consumption priority instruction module during heating of the passenger compartment by the heating module, gives permission for intermittent operation of the internal combustion engine upon condition that the cooling water temperature measured by the cooling water temperature measurement module is not lower than a preset first temperature, while otherwise placing a prohibition on the intermittent operation of the internal combustion engine. In response to reception of the fuel consumption priority instruction given by the fuel consumption priority instruction module during heating of the passenger compartment by the heating module, on the other hand, the intermittent operation permission module gives permission for the intermittent operation of the internal combustion engine upon condition that the cooling water temperature measured by the cooling water temperature measurement module is not lower than a preset second temperature, which is below the preset first temperature, while otherwise placing the prohibition on the intermittent operation of the internal combustion engine. The first hybrid vehicle further includes a control module that, in response to the permission for the intermittent operation of the internal combustion engine given by the intermittent operation permission module, controls the internal combustion engine and the motor to ensure an output power level corresponding to the power demand to the drive shaft with the intermittent operation of the internal combustion engine. In response to the prohibition on the intermittent operation of the internal combustion engine placed by the intermittent operation permission module, on the other hand, the control module controls the internal combustion engine and the motor to ensure the output power level corresponding to the power demand to the drive shaft with continuous operation of the internal combustion engine.

In the first hybrid vehicle of the invention, in response to no reception of the fuel consumption priority instruction during heating of the passenger compartment, permission for intermittent operation of the internal combustion engine is given upon condition that the cooling water temperature of the internal combustion engine is not lower than the preset first temperature. Otherwise the prohibition is placed on the intermittent operation of the internal combustion engine. In response to reception of the fuel consumption priority instruction during heating of the passenger compartment, on the other hand, permission for the intermittent operation of the internal combustion engine is given upon condition that the cooling water temperature of the internal combustion engine is not lower than the preset second temperature, which is below the preset first temperature. Otherwise the prohibition is placed on the intermittent operation of the internal combustion engine. In response to the permission for the intermittent operation of the internal combustion engine, the internal combustion engine and the motor are controlled to ensure the output power level corresponding to the power demand to the drive shaft with the intermittent operation of the internal combustion engine. In response to the prohibition on the intermittent operation of the internal combustion engine, on the contrary, the internal combustion engine and the motor are controlled to ensure the output power level corresponding to the power demand to the drive shaft with continuous operation of the internal combustion engine. The first hybrid vehicle of the invention thus ensures the output power level corresponding to the power demand to the drive shaft with the intermittent operation of the internal combustion engine even in a lower temperature range of the cooling water of the internal combustion engine in response to reception of the fuel consumption priority instruction during heating of the passenger compartment, compared with the case with no reception of the fuel consumption priority instruction. This arrangement effectively improves the energy efficiency of the vehicle, while ensuring a certain level of heating performance.

In one preferable embodiment of the hybrid vehicle of the invention, the intermittent operation permission module gives permission for the intermittent operation of the internal combustion engine, based on a starting-time cooling water temperature measured by the cooling water temperature measurement module at a first start of the internal combustion engine since activation of the hybrid vehicle. This is ascribed to the fact that the cooling water temperature at a start of the internal combustion engine depends upon the outside air temperature and the time period elapsed since a stop of the operation of the vehicle. This arrangement thus assures adequate intermittent operation of the internal combustion engine. The intermittent operation permission module may give permission for the intermittent operation of the internal combustion engine, based on the preset second temperature, which decreases with an increase in starting-time cooling water temperature.

In another preferable embodiment, the hybrid vehicle of the invention further includes an engine operation stop instruction module that gives an engine operation stop instruction for stopping the operation of the internal combustion engine, based on the power demand. In this embodiment, the control module may control the internal combustion engine to be idled, in response to the engine operation stop instruction of the internal combustion engine given by the engine operation stop instruction module under the prohibition on the intermittent operation of the internal combustion engine placed by the intermittent operation permission module.

In one preferable embodiment, the hybrid vehicle of the invention includes an electric power-mechanical power input-output module that is linked to an output shaft of the internal combustion engine and to the drive shaft connecting with a predetermined axle of the hybrid vehicle and outputs at least part of power from the internal combustion engine to the drive shaft through input and output of electric powers and mechanical powers, where the motor is linked to either of the predetermined axle connecting with the drive shaft and another axle of the hybrid vehicle that is different from the predetermined axle. In this embodiment, the control module may control the electric power-mechanic power input-output module. Here, as one structure, the electric power-mechanical power input-output module may include a three shaft-type power input-output unit that is linked to three shafts, the output shaft of the internal combustion engine, the drive shaft, and a rotating shaft, and determines a power input from and output to residual one shaft based on powers input from and output to any two shafts among the three shafts, and a motor that is capable of inputting and outputting power from and to the rotating shaft. As another structure, the electric power-mechanical power input-output module may include a pair-rotor motor that has a first rotor connected to the output shaft of the internal combustion engine and a second rotor connected to the drive shaft, where the first rotor and the second rotor rotate relative to each other to drive the pair-rotor motor.

The present invention is also directed to a second hybrid vehicle that is equipped with an internal combustion engine and a motor and is driven with power output from at least the motor to a drive shaft, the hybrid vehicle including: a heating module that uses the internal combustion engine as a heat source to warm up a passenger compartment; a fuel consumption priority instruction module that gives a fuel consumption priority instruction for giving preference to fuel consumption, in response to an operator's request; a temperature measurement module that measures either of temperature of the internal combustion engine and temperature of a medium, which depends on the temperature of the internal combustion engine, and sets the measured temperature to a control temperature; and a power demand setting module that sets a power demand required for the drive shaft. The second hybrid vehicle also includes an intermittent operation permission module that, in response to no reception of the fuel consumption priority instruction given by the fuel consumption priority instruction module during heating of the passenger compartment by the heating module, gives permission for intermittent operation of the internal combustion engine upon condition that the control temperature measured by the temperature measurement module is not lower than a preset first temperature, while otherwise placing a prohibition on the intermittent operation of the internal combustion engine. In response to reception of the fuel consumption priority instruction given by the fuel consumption priority instruction module during heating of the passenger compartment by the heating module, on the other hand, the intermittent operation permission module giving permission for the intermittent operation of the internal combustion engine upon condition that the control temperature measured by the temperature measurement module is not lower than a preset second temperature, which is below the preset first temperature, while otherwise placing the prohibition on the intermittent operation of the internal combustion engine. The second hybrid vehicle further includes a control module that, in response to the permission for the intermittent operation of the internal combustion engine given by the intermittent operation permission module, controls the internal combustion engine and the motor to ensure an output power level corresponding to the power demand to the drive shaft with the intermittent operation of the internal combustion engine. In response to the prohibition on the intermittent operation of the internal combustion engine placed by the intermittent operation permission module, on the other hand, the control module controlling the internal combustion engine and the motor to ensure the output power level corresponding to the power demand to the drive shaft with continuous operation of the internal combustion engine.

In the second hybrid vehicle of the invention, in response to no reception of the fuel consumption priority instruction during heating of the passenger compartment, permission for intermittent operation of the internal combustion engine is given upon condition that either the temperature of the internal combustion engine or the temperature of a medium, which depends on the temperature of the internal combustion engine, is not lower than the preset first temperature. Otherwise the prohibition is placed on the intermittent operation of the internal combustion engine. In response to reception of the fuel consumption priority instruction during heating of the passenger compartment, on the other hand, permission for the intermittent operation of the internal combustion engine is given upon condition that the control temperature is not lower than the preset second temperature, which is below the preset first temperature. Otherwise the prohibition is placed on the intermittent operation of the internal combustion engine. In response to the permission for the intermittent operation of the internal combustion engine, the internal combustion engine and the motor are controlled to ensure the output power level corresponding to the power demand to the drive shaft with the intermittent operation of the internal combustion engine. In response to the prohibition on the intermittent operation of the internal combustion engine, on the contrary, the internal combustion engine and the motor are controlled to ensure the output power level corresponding to the power demand to the drive shaft with continuous operation of the internal combustion engine. The second hybrid vehicle of the invention thus ensures the output power level corresponding to the power demand to the drive shaft with the intermittent operation of the internal combustion engine even in a lower temperature range of the cooling water of the internal combustion engine in response to reception of the fuel consumption priority instruction during heating of the passenger compartment, compared with the case with no reception of the fuel consumption priority instruction. This arrangement effectively improves the energy efficiency of the vehicle, while ensuring a certain level of heating performance.

The present invention is further directed to a control method of a hybrid vehicle, which is equipped with an internal combustion engine, a motor, a heating module that uses the internal combustion engine as a heat source to warm up a passenger compartment, and a fuel consumption priority instruction module that gives a fuel consumption priority instruction for giving preference to fuel consumption, in response to a operator's request, the hybrid vehicle being driven with power output from at least the motor to a drive shaft. The control method includes the steps of (a) setting a power demand required for the drive shaft and (b) measuring a cooling water temperature in the internal combustion engine. The control method further includes the step (c) that, in response to no reception of the fuel consumption priority instruction given by the fuel consumption priority instruction module during heating of the passenger compartment by the heating module, gives permission for intermittent operation of the internal combustion engine upon condition that the cooling water temperature measured in the step (b) is not lower than a preset first temperature, while otherwise placing a prohibition on the intermittent operation of the internal combustion engine, and in response to reception of the fuel consumption priority instruction given by the fuel consumption priority instruction module during heating of the passenger compartment by the heating module, gives permission for the intermittent operation of the internal combustion engine upon condition that the cooling water temperature measured in the step (b) is not lower than a preset second temperature, which is below the preset first temperature, while otherwise placing the prohibition on the intermittent operation of the internal combustion engine. The control method further includes the step (d) that, in response to the permission for the intermittent operation of the internal combustion engine given in the step (c), controls the internal combustion engine and the motor to ensure an output power level corresponding to the power demand to the drive shaft with the intermittent operation of the internal combustion engine, and in response to the prohibition on the intermittent operation of the internal combustion engine placed in the step (c), controls the internal combustion engine and the motor to ensure the output power level corresponding to the power demand to the drive shaft with continuous operation of the internal combustion engine.

In the control method of the invention, in response to no reception of the fuel consumption priority instruction during heating of the passenger compartment, permission for intermittent operation of the internal combustion engine is given upon condition that the cooling water temperature of the internal combustion engine is not lower than the preset first temperature. Otherwise the prohibition is placed on the intermittent operation of the internal combustion engine. In response to reception of the fuel consumption priority instruction during heating of the passenger compartment, on the other hand, permission for the intermittent operation of the internal combustion engine is given upon condition that the cooling water temperature of the internal combustion engine is not lower than the preset second temperature, which is below the preset first temperature. Otherwise the prohibition is placed on the intermittent operation of the internal combustion engine. In response to the permission for the intermittent operation of the internal combustion engine, the internal combustion engine and the motor are controlled to ensure the output power level corresponding to the power demand to the drive shaft with the intermittent operation of the internal combustion engine. In response to the prohibition on the intermittent operation of the internal combustion engine, on the contrary, the internal combustion engine and the motor are controlled to ensure the output power level corresponding to the power demand to the drive shaft with continuous operation of the internal combustion engine. The control method of the invention thus ensures the output power level corresponding to the power demand to the drive shaft with the intermittent operation of the internal combustion engine even in a lower temperature range of the cooling water of the internal combustion engine in response to reception of the fuel consumption priority instruction during heating of the passenger compartment, compared with the case with no reception of the fuel consumption priority instruction. This arrangement effectively improves the energy efficiency of the vehicle, while ensuring a certain level of heating performance. In one preferable embodiment of the control method of the invention, the step (c) gives permission for the intermittent operation of the internal combustion engine, based on a starting-time cooling water temperature measured by the step (b) at a first start of the internal combustion engine since activation of the hybrid vehicle. In this case, the step (c) may give permission for the intermittent operation of the internal combustion engine, based on the preset second temperature, which decreases with an increase in starting-time cooling water temperature.

In another preferable embodiment, the control method of the invention further includes the step of: (e) giving an engine operation stop instruction for stopping the operation of the internal combustion engine based on the power demand, preceding step (d). In this embodiment, the (d) controls the internal combustion engine to be idled, in response to the engine operation stop instruction of the internal combustion engine given in the step (e) under the prohibition on the intermittent operation of the internal combustion engine placed in the step (c).

BEST MODES OF CARRYING OUT THE INVENTION

Figure 1:
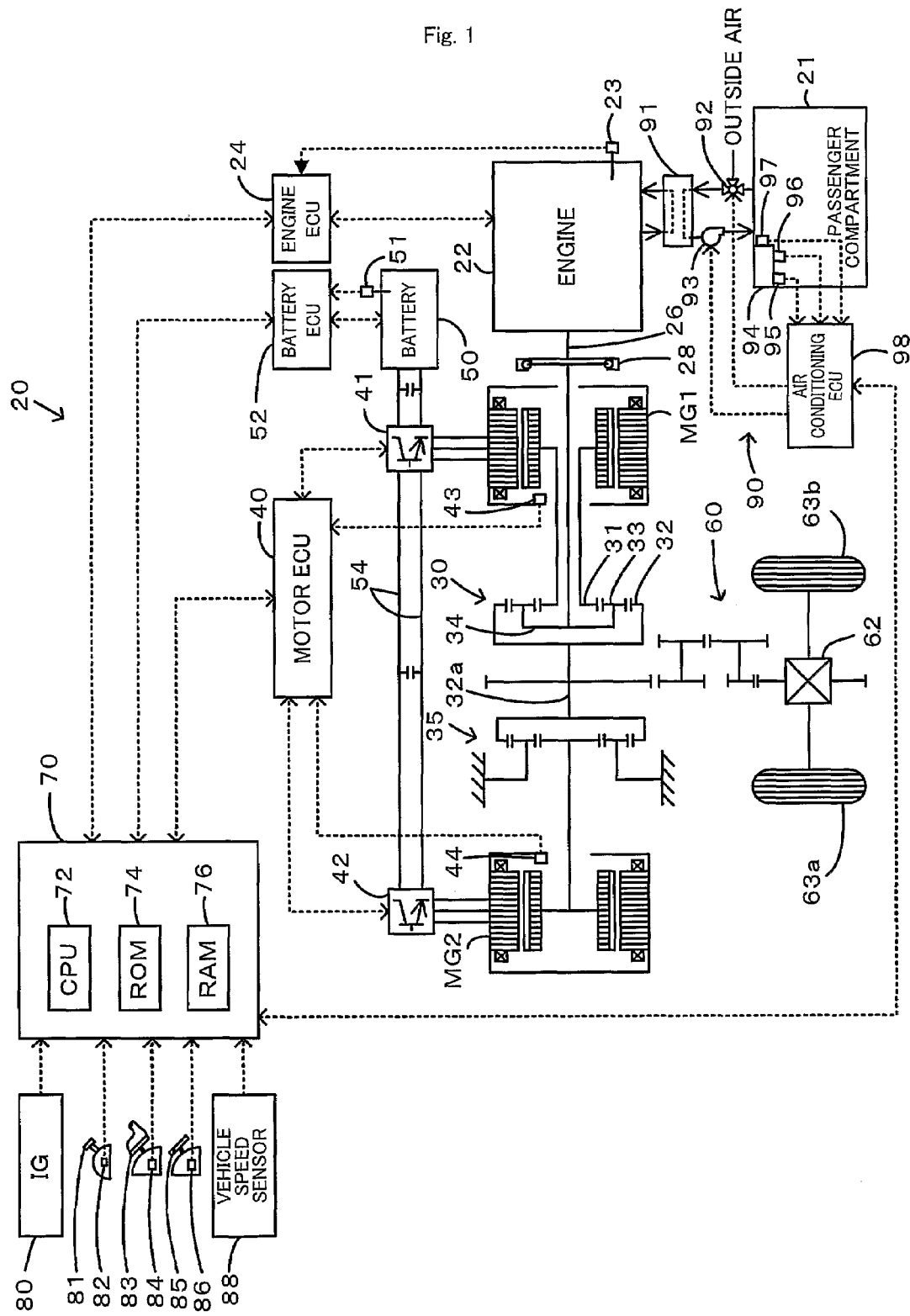
FIG. 1 schematically illustrates the construction of a hybrid vehicle 20 with a power output apparatus mounted thereon in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, an air conditioning system 90 that adjusts temperature in a passenger compartment, and a hybrid electronic control unit 70 that controls the whole power output apparatus.

The engine 22 is an internal combustion engine that consumes a hydrocarbon fuel, such as gasoline or light oil, to output power and is under control of an engine electronic control unit (hereafter referred to as engine ECU) 24. The engine ECU 24 receives input signals from various sensors detecting the driving conditions of the engine 22, such as a cooling water temperature sensor 23 that measures cooling water temperature Tw, and carries out operation control including fuel injection control, ignition control, and intake air flow regulation. The engine ECU 24 communicates with the hybrid electronic control unit 70 and receives control signals from the hybrid electronic control unit 70 to control the operations of the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via the ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is finally transmitted to the driving wheels 63a, 63b via the gear mechanism 60 and differential gear 62 from ring gear shaft 32a.

Both of the motors MG1 and MG2 are constructed as known synchronous generator motors, which are driven as an electric generator as well as an electric motor. The motors MG1 and MG2 transmit electric power from and to a battery 50 via inverters 41 and 42. A power line 54 connecting the inverters 41 and 42 with the battery 50 includes a positive terminal bus line and a negative terminal bus line shared by the two inverters 41 and 42. This arrangement enables the electric power generated by one of the motors MG1 and MG2 to be consumed by the other motor. The motors MG1 and MG2 are both driven and controlled by a motor electronic control unit (hereinafter referred to as motor ECU) 40. The motor ECU 40 receives signals required for driving and controlling the motors MG1 and MG2, for example, signals from rotational position detection sensors 43 and 44 that detect the rotational positions of rotors in the motors MG1 and MG2 and values of phase electric currents supplied to the motors MG1 and MG2 and detected by non-illustrated electric current sensors. The motor ECU 40 outputs switching control signals to the inverters 41 and 42. The motor ECU 40 communicates with the hybrid electronic control unit 70 and drives and controls the motors MG1 and MG2 in response to control signals from the hybrid electronic control unit 70 while outputting data regarding the driving conditions of the motors MG1 and MG2 to the hybrid electronic control unit 70 according to the requirements.

The battery 50 is controlled by a battery electronic control unit (hereinafter referred to as battery ECU) 52. The battery ECU 52 receives signals required for controlling the battery 50, for example, a value of inter-terminal voltage measured by a non-illustrated voltage sensor disposed between terminals of the battery 50, a value of charge discharge electric current measured by a non-illustrated electric current sensor attached to the power line 54 connecting with an output terminal of the battery 50, and a battery temperature Tb measured by a temperature sensor 51 attached to the battery 50. The battery ECU 52 outputs data regarding the conditions of the battery 50 to the hybrid electronic control unit 70 via communication according to the requirements. The battery ECU 52 computes a state of charge (SOC) from an accumulated value of the charge discharge electric current measured by the electric current sensor, and an input limit Win and an output limit Wout of the battery 50 from the state of charge (SOC) and battery temperature Tb, for controlling the battery 50.

The air conditioning system 90 includes a heat exchanger 91 that is located in the cooling system of the engine 22 for heat exchange with cooling water, a blower 93 that takes the outside air or the inside air of the passenger compartment 21 into the heat exchanger 91 and sends the hot air heated through the heat exchange by the heat exchanger 91 into the passenger compartment 21, a switchover mechanism 92 that switches over the air intake source of the blower 93 between the outside air and the inside air of the passenger compartment 21, an operation panel 94 that is placed in the passenger compartment 21, and an air conditioning electronic control unit (air conditioning ECU) 98 that controls the operations of the whole air conditioning system 90. The air conditioning ECU 98 receives, via its input port (not shown), a heater switch signal HSW from a heater switch 95 that is mounted on the operation panel 94 and is operated to control on and off the heater function, an eco-switch signal ESW from an eco-switch 96 that is mounted on the operation panel 94 and is operated to give preference to improvement in fuel consumption of the vehicle over the heater function, and a passenger compartment temperature Tin from a temperature sensor 97 that is attached to the operation panel 94 to measure the internal temperature of the passenger compartment 21. The air conditioning ECU 98 drives and controls the blower 93 in response to these input signals to adjust the passenger compartment temperature Tin to a preset level. The air conditioning ECU 98 establishes communication with the hybrid electronic control unit 70 to output data representing the present conditions of the air conditioning system 90 to the hybrid electronic control unit 70 according to the requirements.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a required torque, which is to be output to the ring gear shaft 32a or the drive shaft, based on the accelerator opening Acc corresponding to the driver's step-on amount of the accelerator pedal 83 and the vehicle speed V. The engine 22 and the motors MG1 and MG2 are under operation control to enable power corresponding to the calculated required torque to be actually output to the ring gear shaft 32a. The operation control of the engine 22 and the motors MG1 and MG2 has multiple modes, a torque conversion drive mode, a charge-discharge drive mode, and a motor drive mode. In the torque conversion drive mode, the engine 22 is under operation control to output a power equivalent to the required power. The motors MG1 and MG2 are driven and controlled to cause the total power output from the engine 22 to be subjected to the torque conversion by means of the power distribution and integration mechanism 30 and the motors MG1 and MG2 and to be output to the ring gear shaft 32a. In the charge-discharge drive mode, the engine 22 is under operation control to output a power equivalent to the sum of the required power and an electric power used for charging and discharging the battery 50. The motors MG1 and MG2 are driven and controlled to cause all or part of the power output from the engine 22 with a charge or a discharge of the battery 50 to be subjected to the torque conversion by means of the power distribution and integration mechanism 30 and the motors MG1 and MG2 and to be output as the required power to the ring gear shaft 32a. In the motor drive mode, the operation of the engine 22 is at a stop, while the motor MG2 is driven and controlled to output a power equivalent to the required power to the ring gear shaft 32a.

Figure 2:
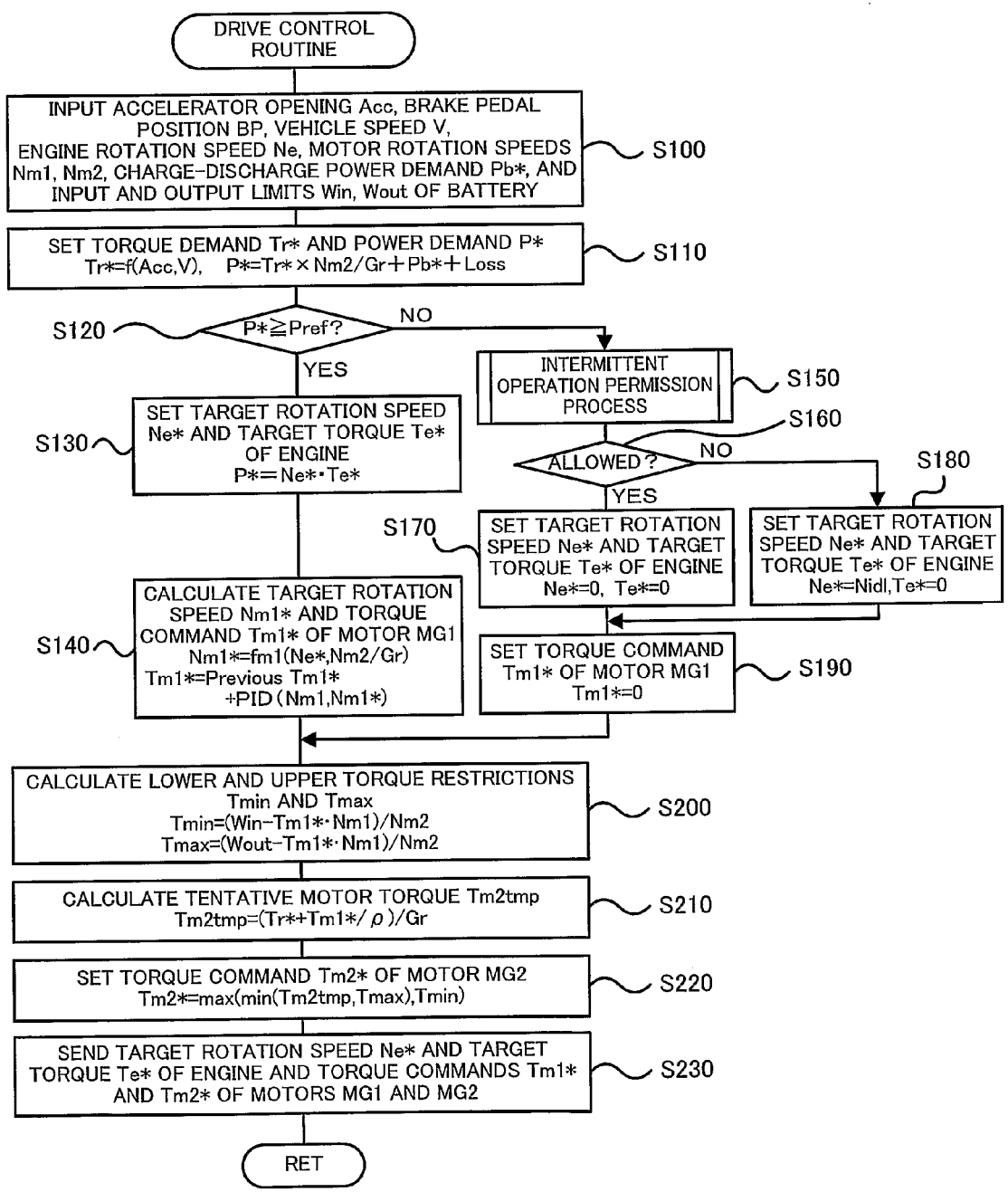
FIG. 2 is a flowchart showing a drive control routine executed by a hybrid electronic control unit 70.

The description now regards the operations of the hybrid vehicle 20 of the embodiment constructed as discussed above, especially a series of control in response to simultaneous ON settings of the heater switch 95 and the eco-switch 96. FIG. 2 is a flowchart showing a drive control routine executed by the hybrid electronic control unit 70 in the hybrid vehicle 20 of the embodiment. This routine is carried out repeatedly at preset time intervals (for example, at every 8 msec).

In the drive control routine, the CPU 72 of the hybrid electronic control unit 70 first inputs various data required for control, that is, the accelerator opening Acc from the accelerator pedal position sensor 84, the brake pedal position BP from the brake pedal position sensor 86, the vehicle speed V from the vehicle speed sensor 88, a rotation speed Ne of the engine 22, rotation speeds Nm1 and Nm2 of the motors MG1 and MG2, and a charge-discharge power demand Pb*, the input limit Win, and the output limit Wout of the battery 50 (step S100). The rotation speed Ne of the engine 22 is computed from a crank position signal detected by a crank position sensor 23a attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The charge-discharge power demand Pb* of the battery 50 is set corresponding to the current state of charge (SOC) of the battery 50 and is received from the battery ECU 52 by communication. The input limit Win and the output limit Wout of the battery 50 are computed by and received from the battery ECU 52 by communication.

Figure 3:
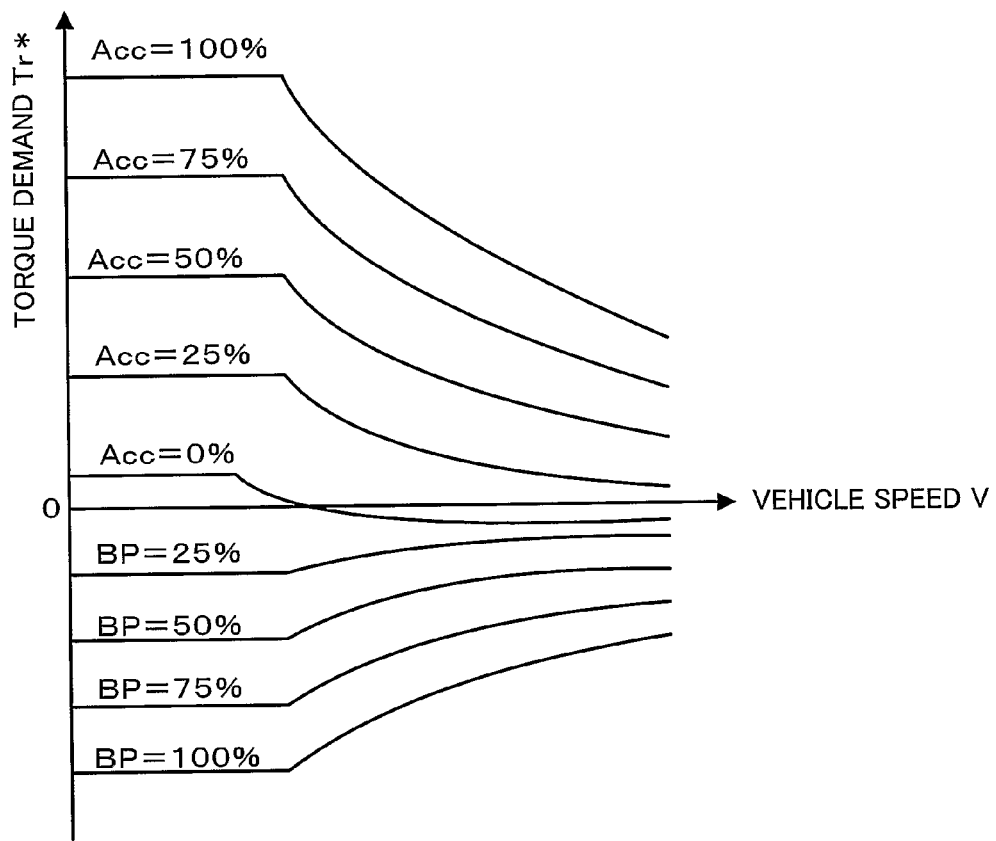
FIG. 3 is an example of a torque demand setting map.

After the data input, the CPU 72 sets a torque demand Tr* to be output to the ring gear shaft 32a or the drive shaft linked to the drive wheels 63a and 63b as the torque required for the vehicle and a power demand P* required to drive the hybrid vehicle 20, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from the map. One example of the torque demand setting map is shown in FIG. 3. This map includes braking torque variations, although this part is not directly related to the control procedure of this embodiment. The power demand P* is calculated as the sum of the product of the torque demand Tr* and a rotation speed Nr of the ring gear shaft 32a or the drive shaft, the charge-discharge power demand Pb* of the battery 50, and a potential loss. The rotation speed Nr of the ring gear shaft 32a is obtained by multiplying the vehicle speed V by a conversion coefficient k or by dividing the rotation speed Nm2 of the motor MG2 by a gear ratio Gr of the reduction gear 35.

Figure 4:
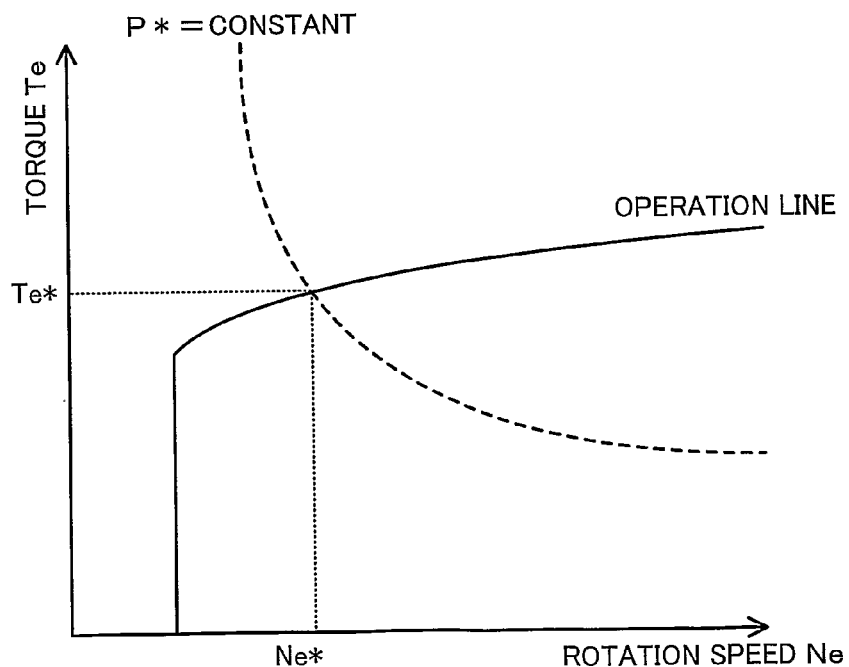
FIG. 4 shows an efficient operation line of an engine 22 to set target rotation speed Ne* and target torque Te*.

The set power demand P* is compared with a predetermined threshold value Pref (step S120). The threshold value Pref is used as a criterion for determining whether the operation of the engine 22 is to be stopped, and is set to or around a lower limit of efficient power output from the engine 22. When the power demand P* is not less than the predetermined threshold value Pref, the CPU 72 sets a target rotation speed Ne* and a target torque Te* of the engine 22 corresponding to the power demand P* (step S130). The target rotation speed Ne* and the target torque Te* of the engine 22 are determined according to an efficient operation line of ensuring efficient operations of the engine 22 and the power demand P*. FIG. 4 shows an efficient operation line of the engine 22 to set the target rotation speed Ne* and the target torque Te*. The target rotation speed Ne* and the target torque Te* are given at an intersection of the efficient operation line and a line of constant power demand P* (=Ne*×Te*).

The CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S140):

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2 \int (Nm1^* - Nm1)dt \quad (2)$$

Figure 5:
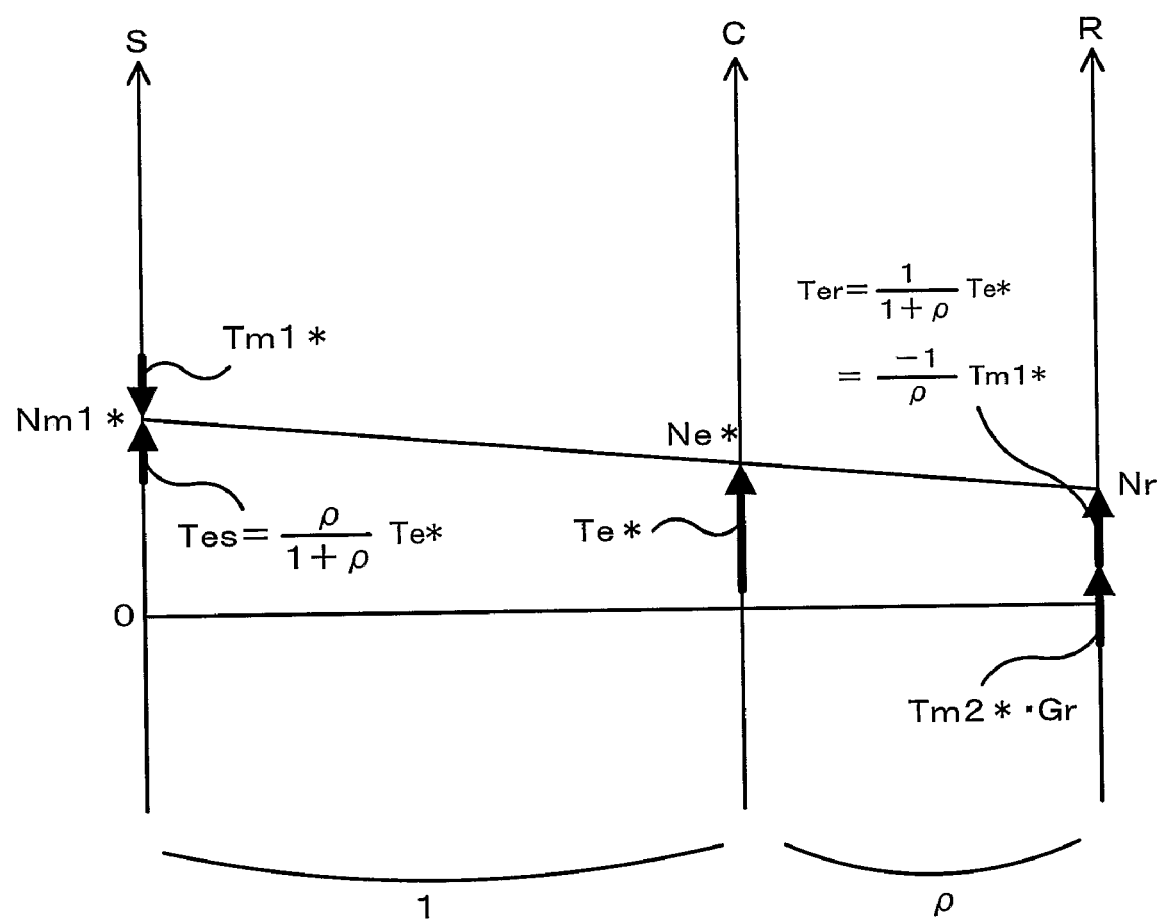
FIG. 5 is an alignment chart showing dynamics of the respective rotation elements included in a power distribution integration mechanism 30.

Equation (1) is a dynamic relational expression of the rotation elements included in the power distribution integration mechanism 30. FIG. 5 is an alignment chart showing torque-rotation speed dynamics of the respective rotation elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a), which is obtained by multiplying the rotation speed Nm2 of the motor MG2 by the gear ratio Gr of the reduction gear 35. Equation (1) is readily introduced from this alignment chart of FIG. 5. Two thick arrows on the axis 'R' respectively show a torque that is transmitted to the ring gear shaft 32a when the torque Te* is output from the engine 22 in steady operation at a specific drive point of the target rotation speed Ne* and the target torque Te*, and a torque that is applied to the ring gear shaft 32a via the reduction gear 35 when a torque Tm2* is output from the motor MG2. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term.

After calculation of the target rotation speed Nm1* and the torque command Tm1* of the motor MG1, the CPU 72 calculates a lower torque restriction Tmin and an upper torque restriction Tmax as minimum and maximum torques output from the motor MG2 according to Equations (3) and (4) given below (step S200):

$$Tmin = (Win - Tm1^* \cdot Nm1)/Nm2 \quad (3)$$

$$Tmax = (Wout - Tm1^* \cdot Nm1)/Nm2 \quad (4)$$

The lower torque restriction Tmin and the upper torque restriction Tmax are respectively given by dividing a difference between the input limit Win of the battery 50 and power consumption (power generation) of the motor MG1, which is the product of the torque command Tm1* and the input current rotation speed Nm1 of the motor MG1, and a difference between the output limit Wout of the battery 50 and the power consumption (power generation) of the motor MG1 by the input current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the reduction gear 35 according to Equation (5) given below (step S210):

$$Tm2tmp = (Tr^* + Tm1^*/\rho)/Gr \quad (5)$$

The CPU 72 limits the calculated tentative motor torque Tm2tmp to the range between the lower torque restriction Tmin and the upper torque restriction Tmax to set a torque command Tm2* of the motor MG2 (step S220). Setting the torque command Tm2* of the motor MG2 in this manner restricts the torque demand Tr* to be output to the ring gear shaft 32a or the drive shaft within the range between the input limit Win and the output limit Wout of the battery 50. Equation (5) is readily introduced from the alignment chart of FIG. 5.

The CPU 72 sends the target rotation speed Ne* and the target torque Te* of the engine 22 to the engine ECU 24, while sending the torque commands Tm1* and Tm2* of the motors MG1 and MG2 to the motor ECU 40 (step S230), before exiting from the drive control routine. The engine ECU 24 receives the target rotation speed Ne* and the target torque Te* and executes fuel injection control and ignition control of the engine 22 to drive the engine 22 at the specified drive point of the target rotation speed Ne* and the target torque Te*. The motor ECU 40 receives the torque commands Tm1* and Tm2* and executes switching control of the switching elements included in the respective inverters 41 and 42 to drive the motor MG1 with the torque command Tm1* and the motor MG2 with the torque command Tm2*.

Figure 6:
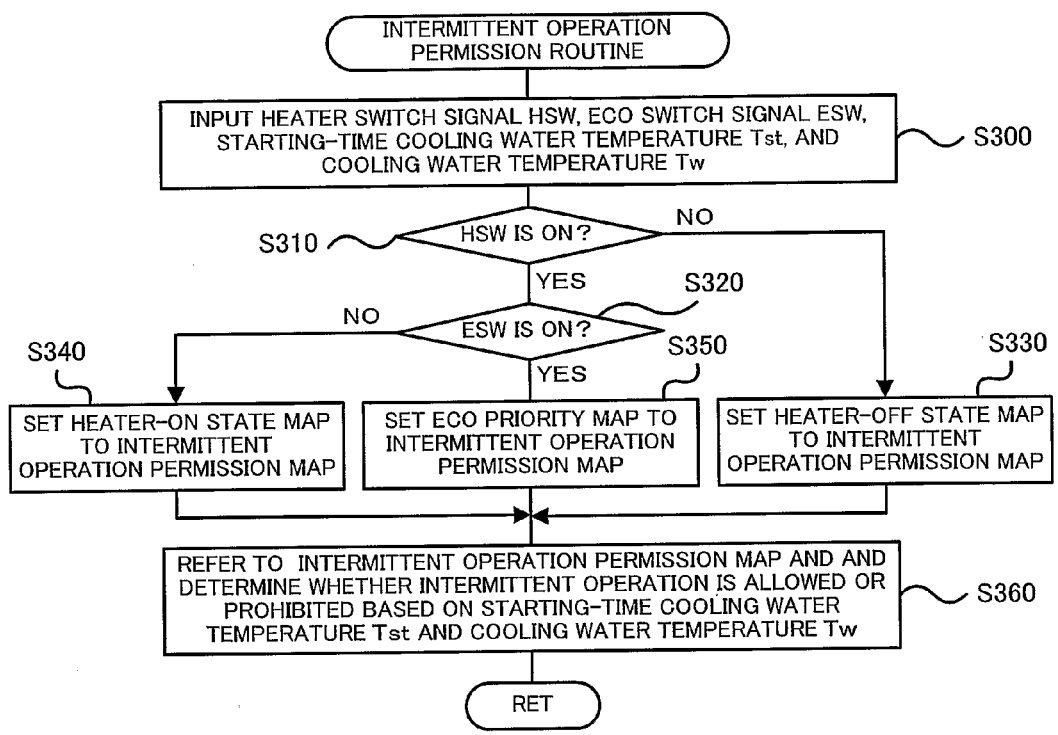
FIG. 6 is a flowchart showing an intermittent operation permission routine executed by the hybrid electronic control unit 70.

When the power demand P* is less than the predetermined threshold value Pref at step S120, the CPU 72 determines whether the intermittent operation of the engine 22 is allowed or prohibited (step S150). The determination of step S150 follows an intermittent operation permission routine shown in the flowchart of FIG. 6 as discussed below.

In the intermittent operation permission routine, the CPU 72 first inputs data required for the determination of whether the intermitted operation of the engine 22 is allowed or prohibited, that is, the heater switch signal HSW, the eco switch signal ESW, a temperature Tst of cooling water at a first start of the engine 22 since activation of the vehicle system (hereafter referred to as starting-time cooling water temperature Tst), and a current cooling water temperature Tw (step S300). The heater switch signal HSW and the eco switch signal ESW are output by the operations of the heater switch 95 and the eco switch 96 and are received from the air conditioning ECU 98 by communication. The cooling water temperature Tw measured by the cooling water temperature sensor 23 at a first start of the engine 22 since activation of the vehicle system is set to the starting-time cooling water temperature Tst and is stored in the engine ECU 24. The starting-time cooling water temperature Tst is accordingly received from the engine ECU 24 by communication. The current cooling water temperature Tw is measured by the cooling water temperature sensor 23 and is received from the engine ECU 24 by communication.

Figure 7:
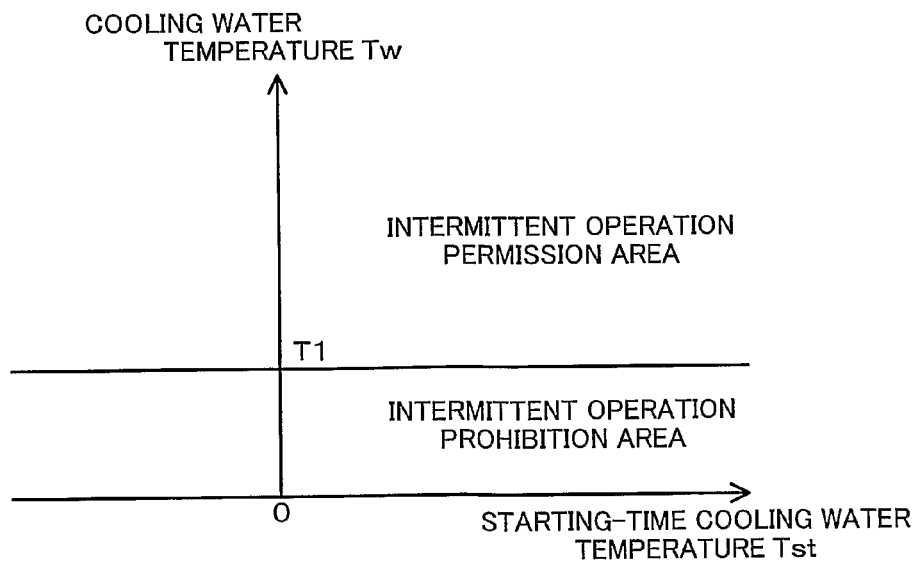
FIG. 7 is an example of a heater-off state map.
Figure 8:
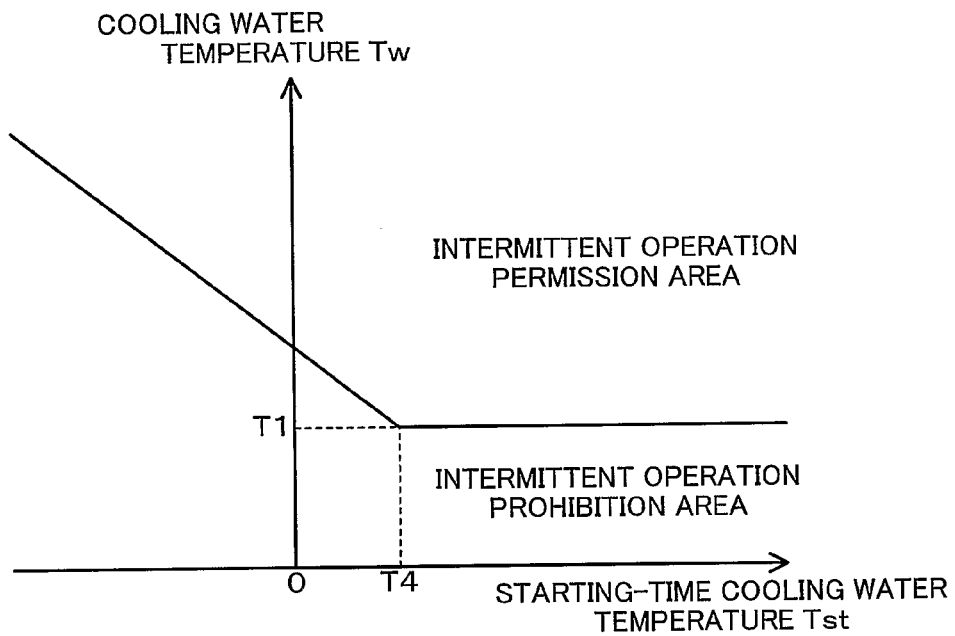
FIG. 8 is an example of a heater-on state map.
Figure 9:
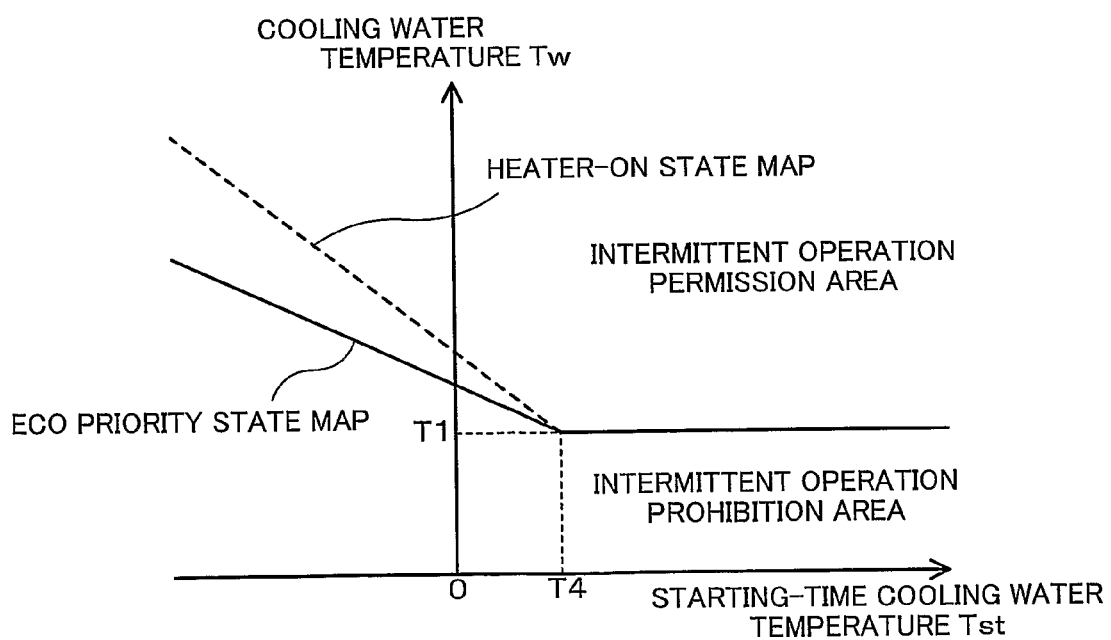
FIG. 9 is an example of an eco priority map.

After the data input, the CPU 72 checks the ON-OFF settings of the heater switch signal HSW and the eco switch signal ESW (steps S310 and S320). In response to the OFF setting of the heater switch signal HSW, a heater-off state map is set to an intermittent operation permission map (step S330). In response to the ON setting of the heater switch signal HSW and the OFF setting of the eco switch signal ESW, a heater-on state map is set to the intermittent operation permission map (step S340). In response to the simultaneous ON settings of the heater switch signal HSW and the eco switch signal ESW, an eco priority map is set to the intermittent operation permission map (step S350). Respective examples of the heater-off state map, the heater-on state map, and the eco priority map are shown in FIGS. 7, 8, and 9. In the heater-off state map of FIG. 7, permission for the intermittent operation of the engine 22 does not depend upon the starting-time cooling water temperature Tst. The intermittent operation of the engine 22 is allowed at the cooling water temperature Tw of not lower than a preset reference temperature T1, but is prohibited at the cooling water temperature Tw of lower than the preset reference temperature T1. This is because, in the heater-off state, there is no necessity of controlling the intermittent operation of the engine 22 for heating the passenger compartment 21. The reference temperature T1 may be set to any arbitrary value, for example, 0° C. or 10° C. In the heater-on state map of FIG. 8, when the starting-time cooling water temperature Tst is not lower than a preset reference temperature T4, permission for the intermittent operation of the engine 22 does not depend upon the starting-time cooling water temperature Tst, like the heater-off state map. The intermittent operation of the engine 22 is allowed at the cooling water temperature Tw of not lower than the preset reference temperature T1, but is prohibited at the cooling water temperature Tw of lower than the preset reference temperature T1. When the starting-time cooling water temperature Tst is lower than the preset reference temperature T4, on the other hand, the lower starting-time cooling water temperature Tst gives the higher cooling water temperature Tw as the permission temperature for the intermittent operation of the engine 22. The starting-time cooling water temperature Tst is the measured temperature of cooling water at a first start of the engine 22 since activation of the vehicle system and accordingly depends upon the outside air temperature and the time elapsed between a previous system activation and a current system activation. Especially when a sufficient time period has elapsed between the previous system activation and the current system activation, the starting-time cooling water temperature Tst well reflects the outside air temperature. The lower outside air temperature thus heightens the permission temperature for the intermittent operation of the engine 22. The heightened permission temperature enhances the heating effects in the passenger compartment 21 in the condition of the lower outside air temperature. The reference temperature T4 may be set to any arbitrary value, for example, 10° C. or 20° C. In the eco priority map of FIG. 9, when the starting-time cooling water temperature Tst is not lower than the preset reference temperature T4, permission for the intermittent operation of the engine 22 does not depend upon the starting-time cooling water temperature Tst, like the heater-off state map. The intermittent operation of the engine 22 is allowed at the cooling water temperature Tw of not lower than the preset reference temperature T1, but is prohibited at the cooling water temperature Tw of lower than the preset reference temperature T1. When the starting-time cooling water temperature Tst is lower than the preset reference temperature T4, on the other hand, the lower starting-time cooling water temperature Tst gives the higher cooling water temperature Tw as the permission temperature for the intermittent operation of the engine 22. The gradient of the permission temperature variation in the eco priority map shown by the solid line in FIG. 9 is, however, gentler than the gradient in the heater-on state map shown in FIG. 8 or by the broken line of FIG. 9. Namely the eco priority map sets the lower cooling water temperature Tw to the permission temperature for the intermittent operation of the engine 22 than the heater-on state map. This increases the potential for permission of the intermittent operation of the engine 22 and accordingly prevents the fuel consumption from being worsened by the unnecessary continuation of the operation of the engine 22 for heating the passenger compartment 21. This control thus ensures the high fuel consumption of the vehicle.

After setting the intermittent operation permission map in response to the ON-OFF settings of the heater switch signal HSW and the eco switch signal ESW, the CPU 72 refers to the intermittent operation permission map and determines whether the intermittent operation of the engine 22 is allowed or prohibited based on the starting-time cooling water temperature Tst and the current cooling water temperature Tw input at step S300 (step S360). The intermittent operation permission routine is then terminated. In response to the simultaneous ON settings of the heater switch signal HSW and the eco switch signal ESW, the eco priority map of FIG. 9 is set to the intermittent operation permission map. Permission for or prohibition on the intermittent operation of the engine 22 accordingly depends upon whether the coordinates of the starting-time cooling water temperature Tst and the current cooling water temperature Tw input at step S300 are located in an intermittent operation permission area or in an intermittent operation prohibition area in the eco priority map.

On termination of the intermittent operation permission routine, the control flow returns to the drive control routine of FIG. 2. When the intermittent operation of the engine 22 is allowed in the intermittent operation permission routine (step S160), the CPU 72 sets both the target rotation speed Ne* and the target torque Te* of the engine 22 to 0 in order to stop the operation of the engine 22 (step S170), and sets the torque command Tm1* of the motor MG1 to 0 (step S190). The drive control routine then sets the torque command Tm2* of the motor MG2 (steps S200 to S220) and sends the target rotation speed Ne* and the target torque Ne* of the engine 22 to the engine ECU 24 and the torque commands Tm1* and Tm2* of the motors MG1 and MG2 to the motor ECU 40 (step S230). In response to reception of the target rotation speed Ne* and the target torque Te* both set to 0, the engine ECU 24 stops the operation of the engine 22.

When the intermittent operation of the engine 22 is prohibited in the intermittent operation permission routine (step S160), on the other hand, the CPU 72 sets an idle rotation speed Nid1 specified for idle operation of the engine 22 and the value 0 respectively to the target rotation speed Ne* and the target torque Te* of the engine (step S180), and sets the torque command Tm1* of the motor MG1 to 0 (step S190). The drive control routine then sets the torque command Tm2* of the motor MG2 (steps S200 to S220) and sends the target rotation speed Ne* and the target torque Ne* of the engine 22 to the engine ECU 24 and the torque commands Tm1* and Tm2* of the motors MG1 and MG2 to the motor ECU 40 (step S230). In response to reception of the target rotation speed Ne* set to the idle rotation speed Nid1 and the target torque Te* set to 0, the engine ECU 24 controls the engine 22 to be idled at the idle rotation speed Nid1.

In the hybrid vehicle 20 of the embodiment described above, under the ON setting of the heater switch signal HSW, the cooling water temperature Tw of the engine 22 set to the permission temperature for the intermittent operation of the engine 22 in the ON setting of the eco switch signal ESW is lower than that in the OFF setting of the eco switch signal ESW. Such setting increases the potential for permission of the intermittent operation of the engine 22 in the ON setting of the eco switch signal ESW. This control improves the fuel consumption of the vehicle, while slightly lowering the heating performance. The higher cooling water temperature Tw is set to the permission temperature for the intermittent operation of the engine 22 with a decrease in starting-time cooling water temperature Tst, which represents the temperature of cooling water at a first start of the engine 22 since activation of the vehicle system, in the range of lower than the preset reference temperature T4. The permission temperature for the intermittent operation of the engine 22 thus well reflects the outside air temperature and the time elapsed between a previous system activation and a current system activation.

In the hybrid vehicle 20 of the embodiment, the eco priority map and the heater-on state map are designed to set the higher cooling water temperature Tw to the permission temperature for the intermittent operation of the engine 22 with a decrease in starting-time cooling water temperature Tst in the range of lower than the preset reference temperature T4. Each of the eco priority map and the heater-on state map may be modified to set the boundary between permission for and prohibition on the intermittent operation of the engine 22 at a predetermined reference level of the cooling water temperature Tw, regardless of the starting-time cooling water temperature Tst. In such modification, the reference level in the eco priority map should be set lower than the reference level in the heater-on state map.

In the hybrid vehicle 20 of the embodiment, the eco priority map and the heater-on state map are designed to set the higher cooling water temperature Tw to the permission temperature for the intermittent operation of the engine 22 with a decrease in starting-time cooling water temperature Tst in the range of lower than the preset reference temperature T4. In another possible modification, the eco priority map may be designed to set the higher cooling water temperature Tw to the permission temperature for the intermittent operation of the engine 22 with a decrease in starting-time cooling water temperature Tst in the range of lower than another specified level, which is lower than the preset reference temperature T4.

The hybrid vehicle 20 of the embodiment refers to the heater-on state map in the ON setting of the heater switch signal HSW and the OFF setting of the eco switch signal ESW, and determines whether the intermittent operation of the engine 22 is allowed or prohibited, based on the starting-time cooling water temperature Tst and the current cooling water temperature Tw. One modified control may unconditionally prohibit the intermittent operation of the engine 22, regardless of the starting-time cooling water temperature Tst and the current cooling water temperature Tw, in the ON setting of the heater switch signal HSW and the OFF setting of the eco switch signal ESW.

Figure 10:
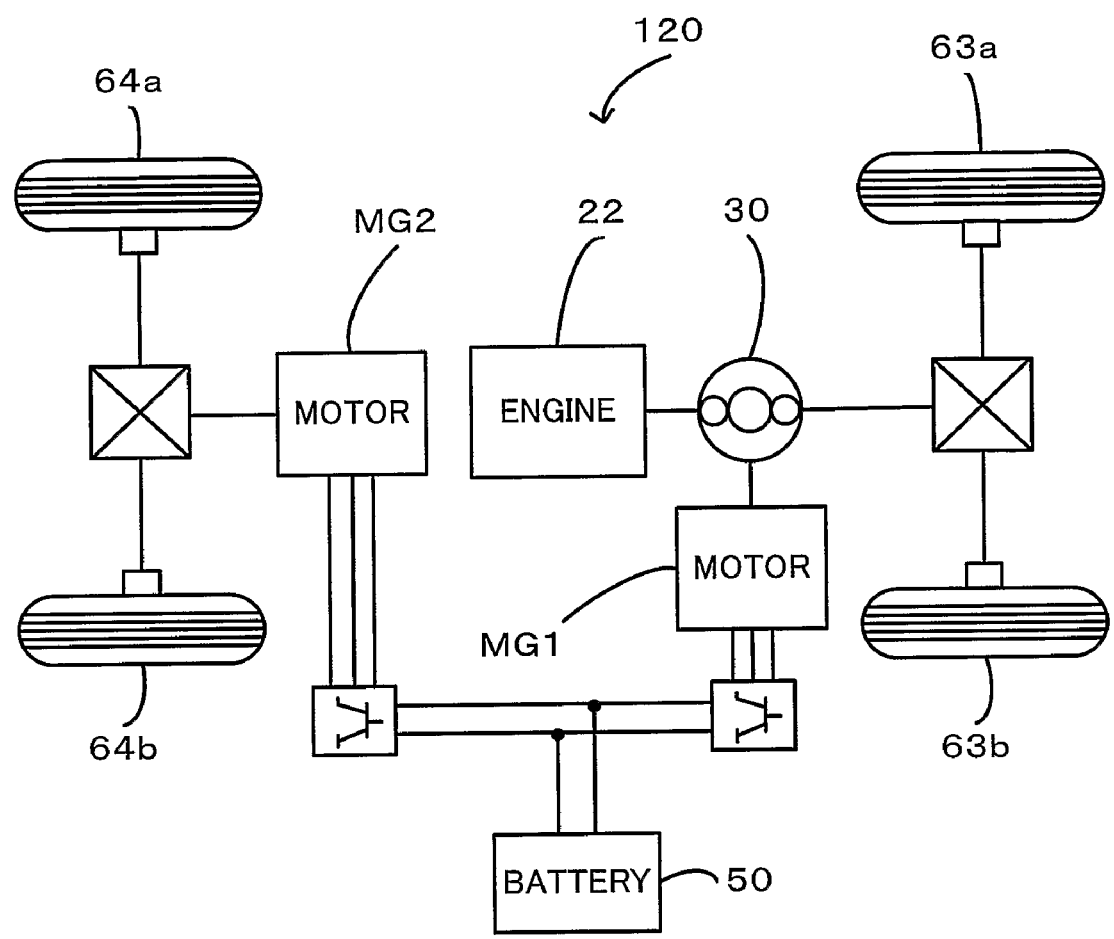
FIG. 10 schematically illustrates the construction of a hybrid vehicle 120 with a power output apparatus mounted thereon in one modified example.
Figure 11:
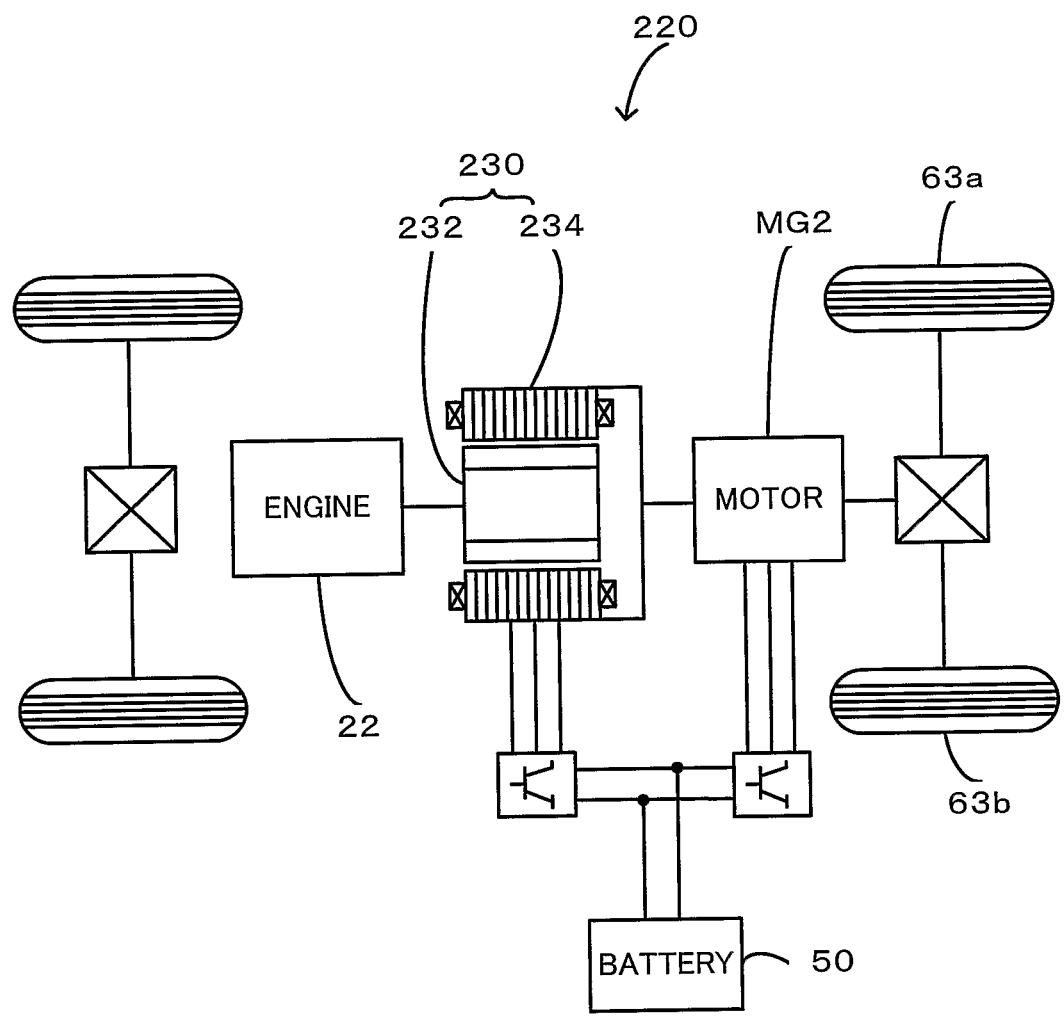
FIG. 11 schematically illustrates the construction of a hybrid vehicle 220 with a power output apparatus mounted thereon in another modified example.

In the hybrid vehicle 20 of the embodiment, the power of the motor MG2 is output to the ring gear shaft 32a after torque conversion by the reduction gear 35. The technique of the invention may be adopted in a hybrid vehicle 120 of a modified configuration shown in FIG. 10, where the power of the motor MG2 is transmitted to a different axle (an axle linked to wheels 64a and 64b) from the axle connecting with the ring gear shaft 32a (the axle linked to the drive wheels 63a and 63b). In the hybrid vehicle 20 of the embodiment, the power of the engine 22 is output via the power distribution integration mechanism 30 to the ring gear shaft 32a or the drive shaft linked to the drive wheels 63a and 63b. The technique of the invention is also applicable to a hybrid vehicle 220 of another modified configuration that has a pair-rotor motor 230 as shown in FIG. 11. The pair-rotor motor 230 includes an inner rotor 232 connected to the crankshaft 26 of the engine 22 and an outer rotor 234 connected to the drive shaft of outputting power to the drive wheels 63a and 63b. Part of the output power of the engine 22 is transmitted to the drive shaft, while the residual part of the engine output power is converted into electric power. The technique of the invention may be applied to any hybrid vehicle that is structured to allow the intermittent operation of an engine and uses the engine as a heat source to warm up a passenger compartment.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

INDUSTRIAL APPLICABILITY

The technique of the invention is applicable to vehicle manufacturing industry.

The invention claimed is:

1. A hybrid vehicle that is equipped with an internal combustion engine and a motor and is driven with power output from at least the motor to a drive shaft, said hybrid vehicle comprising:
    a heating module that uses the internal combustion engine as a heat source to warm up a passenger compartment;
    a fuel consumption priority instruction module that gives a fuel consumption priority instruction for giving preference to fuel consumption, in response to an operator's request;
    a cooling water temperature measurement module that measures a cooling water temperature in the internal combustion engine;
    a power demand setting module that sets a power demand required for the drive shaft;
    an intermittent operation permission module that, in response to no reception of the fuel consumption priority instruction given by said fuel consumption priority instruction module during heating of the passenger compartment by said heating module, gives permission for intermittent operation of the internal combustion engine upon condition that the cooling water temperature measured by said cooling water temperature measurement module is not lower than a preset first temperature, while otherwise placing a prohibition on the intermittent operation of the internal combustion engine,
    in response to reception of the fuel consumption priority instruction given by said fuel consumption priority instruction module during heating of the passenger compartment by said heating module, said intermittent operation permission module giving permission for the intermittent operation of the internal combustion engine upon condition that the cooling water temperature measured by said cooling water temperature measurement module is not lower than a preset second temperature, which is below the preset first temperature, while otherwise placing the prohibition on the intermittent operation of the internal combustion engine; and
    a control module that, in response to the permission for the intermittent operation of the internal combustion engine given by said intermittent operation permission module, controls the internal combustion engine and the motor to ensure an output power level corresponding to the power demand to the drive shaft with the intermittent operation of the internal combustion engine,
    in response to the prohibition on the intermittent operation of the internal combustion engine placed by said intermittent operation permission module, said control module controlling the internal combustion engine and the motor to ensure the output power level corresponding to the power demand to the drive shaft with continuous operation of the internal combustion engine.

2. A hybrid vehicle in accordance with claim 1, wherein said intermittent operation permission module gives permission for the intermittent operation of the internal combustion engine, based on a starting-time cooling water temperature measured by said cooling water temperature measurement module at a first start of the internal combustion engine since activation of said hybrid vehicle.

3. A hybrid vehicle in accordance with claim 2, wherein said intermittent operation permission module gives permission for the intermittent operation of the internal combustion engine, based on the preset second temperature, which decreases with an increase in starting-time cooling water temperature.

4. A hybrid vehicle in accordance with claim 1, said hybrid vehicle further comprising:
an engine operation stop instruction module that gives an engine operation stop instruction for stopping the operation of the internal combustion engine, based on the power demand,
wherein said control module controls the internal combustion engine to be idled, in response to the engine operation stop instruction of the internal combustion engine given by said engine operation stop instruction module under the prohibition on the intermittent operation of the internal combustion engine placed by said intermittent operation permission module.

5. A hybrid vehicle in accordance with claim 1, said hybrid vehicle further comprising:
an electric power-mechanical power input-output module that is linked to an output shaft of the internal combustion engine and to the drive shaft connecting with a predetermined axle of said hybrid vehicle and outputs at least part of power from the internal combustion engine to the drive shaft through input and output of electric powers and mechanical powers,
wherein the motor is linked to either of the predetermined axle connecting with the drive shaft and another axle of said hybrid vehicle that is different from the predetermined axle, and
said control module controls said electric power-mechanic power input-output module.

6. A hybrid vehicle in accordance with claim 5,
wherein said electric power-mechanical power input-output module comprises a three shaft-type power input-output unit that is linked to three shafts, the output shaft of the internal combustion engine, the drive shaft, and a rotating shaft, and determines a power input from and output to residual one shaft based on powers input from and output to any two shafts among the three shafts, and a motor that is capable of inputting and outputting power from and to the rotating shaft.

7. A hybrid vehicle in accordance with claim 5,
wherein said electric power-mechanical power input-output module comprises a pair-rotor motor that has a first rotor connected to the output shaft of the internal combustion engine and a second rotor connected to the drive shaft, where the first rotor and the second rotor rotate relative to each other to drive the pair-rotor motor.

8. A hybrid vehicle that is equipped with an internal combustion engine and a motor and is driven with power output from at least the motor to a drive shaft, said hybrid vehicle comprising:
a heating module that uses the internal combustion engine as a heat source to warm up a passenger compartment;
a fuel consumption priority instruction module that gives a fuel consumption priority instruction for giving preference to fuel consumption, in response to an operator's request;
a temperature measurement module that measures either of temperature of the internal combustion engine and temperature of a medium, which depends on the temperature of the internal combustion engine, and sets the measured temperature to a control temperature;
a power demand setting module that sets a power demand required for the drive shaft;
an intermittent operation permission module that, in response to no reception of the fuel consumption priority instruction given by said fuel consumption priority instruction module during heating of the passenger compartment by said heating module, gives permission for intermittent operation of the internal combustion engine upon condition that the control temperature measured by said temperature measurement module is not lower than a preset first temperature, while otherwise placing a prohibition on the intermittent operation of the internal combustion engine,
in response to reception of the fuel consumption priority instruction given by said fuel consumption priority instruction module during heating of the passenger compartment by said heating module, said intermittent operation permission module giving permission for the intermittent operation of the internal combustion engine upon condition that the control temperature measured by said temperature measurement module is not lower than a preset second temperature, which is below the preset first temperature, while otherwise placing the prohibition on the intermittent operation of the internal combustion engine; and
a control module that, in response to the permission for the intermittent operation of the internal combustion engine given by said intermittent operation permission module, controls the internal combustion engine and the motor to ensure an output power level corresponding to the power demand to the drive shaft with the intermittent operation of the internal combustion engine,
in response to the prohibition on the intermittent operation of the internal combustion engine placed by said intermittent operation permission module, said control module controlling the internal combustion engine and the motor to ensure the output power level corresponding to the power demand to the drive shaft with continuous operation of the internal combustion engine.

9. A control method of a hybrid vehicle, which is equipped with an internal combustion engine, a motor, a heating module that uses the internal combustion engine as a heat source to warm up a passenger compartment, and a fuel consumption priority instruction module that gives a fuel consumption priority instruction for giving preference to fuel consumption, in response to a operator's request, said hybrid vehicle being driven with power output from at least the motor to a drive shaft,
said control method comprising the steps of:
(a) setting a power demand required for the drive shaft;
(b) measuring a cooling water temperature in the internal combustion engine;
(c) in response to no reception of the fuel consumption priority instruction given by said fuel consumption priority instruction module during heating of the passenger compartment by said heating module, giving permission for intermittent operation of the internal combustion engine upon condition that the cooling water temperature measured in said step (b) is not lower than a preset first temperature, while otherwise placing a prohibition on the intermittent operation of the internal combustion engine,
in response to reception of the fuel consumption priority instruction given by said fuel consumption priority instruction module during heating of the passenger compartment by said heating module, giving permission for the intermittent operation of the internal combustion engine upon condition that the cooling water temperature measured in said step (b) is not lower than a preset second temperature, which is below the preset first temperature, while otherwise placing the prohibition on the intermittent operation of the internal combustion engine; and (d) in response to the permission for the intermittent operation of the internal combustion engine given in said step (c), controlling the internal combustion engine and the motor to ensure an output power level corresponding to the power demand to the drive shaft with the intermittent operation of the internal combustion engine, in response to the prohibition on the intermittent operation of the internal combustion engine placed in said step (c), controlling the internal combustion engine and the motor to ensure the output power level corresponding to the power demand to the drive shaft with continuous operation of the internal combustion engine.

10. A control method in accordance with claim 9, wherein said step (c) gives permission for the intermittent operation of the internal combustion engine, based on a starting-time cooling water temperature measured by said step (b) at a first start of the internal combustion engine since activation of said hybrid vehicle.

11. A control method in accordance with claim 10, wherein said step (c) gives permission for the intermittent operation of the internal combustion engine, based on the preset second temperature, which decreases with an increase in starting-time cooling water temperature.

12. A control method in accordance with claim 9, said control method further comprising the step of:

(e) giving an engine operation stop instruction for stopping the operation of the internal combustion engine based on the power demand, preceding step (d), wherein said (d) controls the internal combustion engine to be idled, in response to the engine operation stop instruction of the internal combustion engine given in said step (e) under the prohibition on the intermittent operation of the internal combustion engine placed in said step (c).

* * * * *

UNITED STATES PATENT AND TRADEMARK OFFICE
CERTIFICATE OF CORRECTION

PATENT NO. : 7,406,378 B2  Page 1 of 1
APPLICATION NO. : 11/587753
DATED : July 29, 2008
INVENTOR(S) : Osamu Harada et al.

It is certified that error appears in the above-identified patent and that said Letters Patent is hereby corrected as shown below:

| Column | Line | |
|---|---|---|
| 14 | 37 | Change "Nid1" to --Nidl--. |
| 14 | 47 | Change "Nid1" to --Nidl--. |
| 14 | 49 | Change "Nid1" to --Nidl--. |

Signed and Sealed this

Fifth Day of May, 2009

JOHN DOLL
*Acting Director of the United States Patent and Trademark Office*